March 25, 1969 E. H. FLAMING 3,435,109

PROCESS FOR FLARING PLASTIC PIPE ENDS

Original Filed Nov. 20, 1963

INVENTOR.
E. H. FLAMING

BY *Young + Jugg*

ATTORNEYS

United States Patent Office 3,435,109
Patented Mar. 25, 1969

3,435,109
PROCESS FOR FLARING PLASTIC PIPE ENDS
Edwin H. Flaming, Bartlesville, Okla., assignor to Phillips Petroleum Company, a corporation of Delaware
Original application Nov. 20, 1963, Ser. No. 325,030, now Patent No. 3,341,894. Divided and this application Mar. 30, 1967, Ser. No. 627,074
Int. Cl. B29c 17/00
U.S. Cl. 264—322      1 Claim

ABSTRACT OF THE DISCLOSURE

A method of forming a flange, on a thermoplastic pipe where the end of the pipe is heated and the walls of the pipe are forced outwardly to form a flange.

---

This application is a divisional of my copending application, Ser. No. 325,030, filed Nov. 20, 1963, now U.S. Patent No. 3,341,894.

This invention relates to flaring the ends of thermoplastic pipe to form a flange. In one aspect the invention relates to a method for forming a flange on the end of a plastic liner in a conduit.

Flanged connections for joining sections of plastic-lined conduit have been proposed and utilized to a limited extent. It has been the practice to mold flanges which are then welded or fused to the end of the plastic liner as required. This method is unsatisfactory because a variety of sizes of flanges must be maintained in stock in order to have the required size when needed. Furthermore, it is difficult and unsatisfactory to weld a flange onto a liner that is already positioned in a conduit.

I have devised a method of forming a flange on a plastic tubing liner when the liner is positioned in the conduit to be lined. The end of the plastic liner extending beyond the conduit can be flared to form a flange mating with the conduit flange in less time than required to fuse a preformed flange onto the end of a plastic liner positioned in a conduit. Although the invention is particularly useful for flaring a plastic liner in a conduit, it can also be used to flare a plastic pipe end wherein the plastic pipe is not positioned in a conduit. The steps employed are the same in either case.

It is an object of this invention to provide a method for forming a flange on the end of a thermoplastic tube.

It is also an object to provide a method for flaring the end of a plastic liner positioned in a conduit.

Other objects and advantages of the invention will be apparent to one skilled in the art upon study of this disclosure including the detailed description of the invention and the appended drawing.

Figure 1:
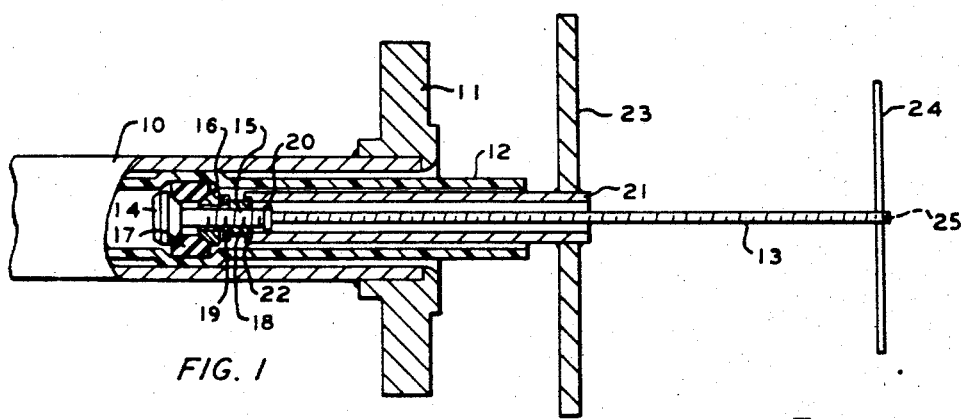
FIGURE 1 is a view, partly in section, of a device shown in the first step of the invention.

Referring to the drawing and particularly to FIGURE 1, a conduit 10 having a flange 11 secured to its end contains a plastic liner 12 which extends a distance beyond the flange 11. A threaded mounting shaft 13 has secured rigidly to one end a first pressure plate 14 beveled on the shaft side outwardly from the shaft. A portion of the threaded shaft adjacent the pressure plate is of larger diameter than the remainder of the shaft as indicated at 15. A second beveled pressure plate 16 is slidably mounted on the enlarged portion of the shaft 15 with the beveled portion opposite to that of the beveled portion on the first pressure plate 14. A rubber anchor ring 17 is positiond between the pressure plates 14 and 16 so that as the pressure plates are forced together the anchor ring 17 is deformed outwardly at its periphery so as to enlarge effectively its external diameter dimension. A nut 18 is threaded onto the enlarged portion 15 of the mounting shaft 13 with a thrust washer 19 between the pressure plate 16 and the nut 18. A snap ring 20 prevents removal of the nut 18 from the threaded portion 15 of the shaft.

A wrench 21 having an opening 22 in one end to fit over the nut 18 and having a handle 23 at its other end has a passageway throughout its body to allow the wrench to be passed over the threaded shaft 13. After the wrench 21 is positioned over the nut 18, a pin 24 is passed through an opening 25 in the end of shaft 13 so that the shaft can be prevented from turning while the wrench 21 is applied to the nut 18 to force the pressure plate 16 toward the pressure plate 14 and to expand the anchor ring 17 outwardly against the plastic liner 12 thereby securing the mounting shaft 13 in position as shown in FIGURE 1. It is not necessary that the plastic liner be deformed as illustrated in the drawing. It is necessary only that the anchor ring be pressed against the plastic liner so that the anchor ring does not slip in the liner.

Figure 2:
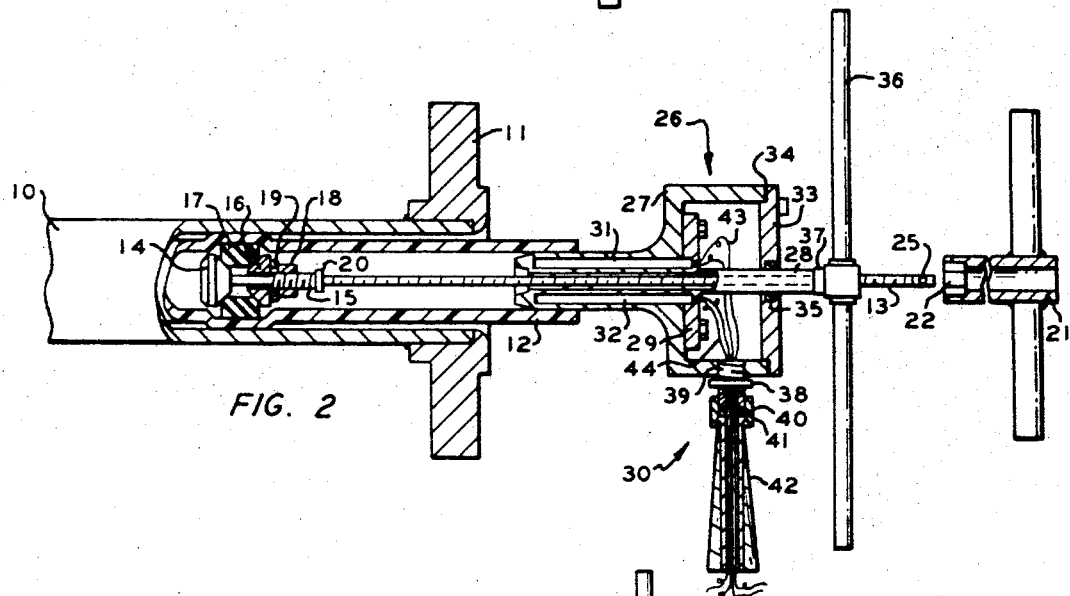
FIGURE 2 is a similar view showing the second step of the invention.

When the shaft is secured in position, the pin 24 and the wrench 21 are removed and a flaring plug 26 is passed over the shaft 13 into the position shown in FIGURE 2. The flaring plug is composed of plug body 27, plug guide sleeve 28 which is secured to flange 29, and handle assembly 30.

The plug body 27 has a plurality of heater wells 31 and a thermoswitch well 32 in the plug body covered by the flange 29 which has openings for passageway of electrical lead lines to the heaters and the thermoswitch in the wells 31 and 32. A cover plate 33 is secured to one opening of plug body 27 and is sealed by means of gasket 34 around the periphery of the opening and by means of O-ring 35 around the sleeve 28. A traveling wrench 36 is threaded onto shaft 13 with a thrust washer 37 between the wrench 36 and the end of the sleeve 28.

A handle assembly 30 is threaded into plug body 27. The handle assembly 30 comprises a sleeve 38 threaded on each end. One threaded end of the sleeve 38 is threaded into an opening 39 in plug body 27 and a compression nut 40 containing a rubber grommet 41 and insulated handle 42 is threaded onto the other end of the sleeve 38 so as to compress the grommet 41 against the end of the sleeve 38 and thus to close the opening in sleeve 38.

Lead wires 43 from the heaters in the heater wells 31 and lead wires 44 from the thermoswitch in well 32 pass out from the plug body 27 through the open passageway of sleeve 38 so that the rubber grommet 41 is compressed about these lead wires to form an explosion-proof flaring plug 26.

Figure 3:
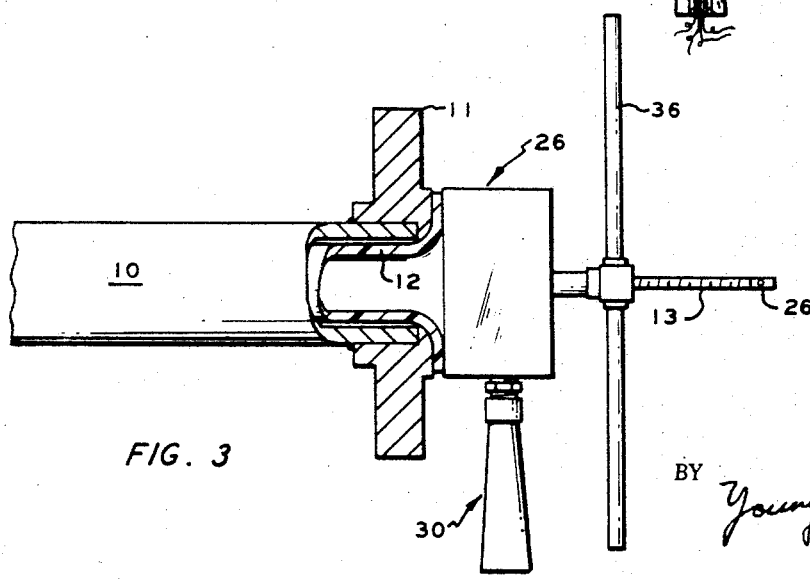
FIGURE 3 is a view of the third step of the invention.

The flaring plug 26 and the traveling wrench 36 are positioned as shown in FIGURE 2, the heaters in the heating wells 31 are turned on, or have been previously turned on, so that the flaring plug 26 is heated to the proper temperature to soften the plastic liner 12, and the traveling wrench 36 is then rotated so as to force the flaring plug 26 along the mounting shaft 13 until the softened plastic liner 12 conforms to the configurations of the flange 11 and the flaring plug 26, as shown in FIGURE 3. The flaring plug 26 is prevented from rotation by means of the insulated handle 42 of the handle assembly 30.

The traveling wrench is then removed from the shaft 13 and the flaring plug 26 is removed from its position. Wrench 21 is then passed over the shaft 13 and engaged with the nut 18 to retract pressure plate 16 back against the retaining ring 20, allowing the anchor ring 17 to assume its normal diameter which is smaller than the inside of the plastic liner so that the mounting shaft 13 can be withdrawn from the liner 12 and the conduit 10.

The steps employed in flaring the end of a thermoplastic tube, not positioned in a conduit, are the same as above described except the softened plastic is made to conform only to the flaring plug 26.

That which is claimed is:

1. The method of forming a flange on the end of a thermoplastic pipe, said method comprising, in combination, the steps of:
   (a) inserting a resilient annularly expandable anchoring element having an axially aligned, partially threaded, mounting shaft into said pipe, and allowing said mounting shaft to extend beyond the end of said pipe;
   (b) expanding said anchoring member into frictional constraint with the interior of said pipe;
   (c) passing a flaring plug over said mounting shaft;
   (d) threadably mounting a traveling element on said shaft in driving contact with said plug;
   (e) heating the end of said thermoplastic pipe to a temperature just above its softening point by heating said flaring plug;
   (f) applying tension between said anchoring member and said flaring plug by rotating said traveling element about said shaft to drive said plug toward said anchoring element, forcing the wall of the end of said pipe upwardly to conform to the exterior configuration of said heated plug until the plane of the end of the wall of the pipe is substantially normal to the longitudinal axis of said pipe; and
   (g) releasing tension between said anchoring member and said flaring plug to permit contraction and withdrawal of said anchoring member from said pipe.

References Cited

UNITED STATES PATENTS

| | | | |
|---|---|---|---|
| 2,608,501 | 8/1952 | Kimble | 154—82 |
| 2,779,996 | 2/1957 | Tanis | 29—235 |
| 2,823,418 | 2/1958 | Fritts | 18—19 |
| 2,876,496 | 3/1959 | Murphy | 264—322 X |
| 2,977,633 | 4/1961 | Breitenstein | 18—19 |
| 3,013,925 | 12/1961 | Larson | 264—322 X |
| 3,030,253 | 4/1962 | St. John | 156—196 |
| 3,042,965 | 7/1962 | Gray | 18—1 |
| 3,047,937 | 8/1962 | Vecchi | 29—157 |
| 3,142,868 | 8/1964 | Blount | 18—19 |

FOREIGN PATENTS

| | | |
|---|---|---|
| 141,671 | 9/1948 | Australia. |
| 639,997 | 7/1950 | Great Britain. |
| 379,832 | 1962 | Japan. |
| 135,313 | 1961 | Russia. |
| 589,129 | 2/1959 | Italy. |

ROBERT F. WHITE, *Primary Examiner.*

RICHARD R. KUCIA, *Assistant Examiner.*

U.S. Cl. X.R.

264—296, 313